United States Patent [19]
Harper

[11] 3,746,048
[45] July 17, 1973

[54] FLUID METERING SYSTEM

[75] Inventor: Robert C. Harper, Loveland, Ohio

[73] Assignee: Cincinnati Milacron Inc., Cincinnati, Ohio

[22] Filed: June 20, 1972

[21] Appl. No.: 264,604

[52] U.S. Cl.................. 137/628, 137/607, 137/635
[51] Int. Cl............................................ F16k 19/00
[58] Field of Search.................... 137/628, 635, 607; 425/130, 131, 132

[56] References Cited
UNITED STATES PATENTS
748,763   1/1904   MacFadden .................... 137/607 X
2,575,305  11/1951  Stryzakoski ..................... 137/607 X

*Primary Examiner*—Robert G. Nilson
*Attorney*—Alfred S. Mangels et al.

[57] ABSTRACT

A fluid metering system for assuring a substantially constant supply ratio of a plurality of components of a multi-component mixture during both steady-state and start-up conditions. The system includes a plurality of inlet valves, one for each of the fluids comprising a portion of the mixture, and also includes means for simultaneously actuating each of the inlet valves from a no-flow to a full-flow position. The system further includes means for adjusting the relative angular positions of the several valve members of each of the valves in order to permit variations in initial flow starting times between the valves and thereby compensate for pressure or viscosity differences between the several components of the mixture to maintain a substantially constant ratio of the components.

11 Claims, 6 Drawing Figures

Patented July 17, 1973  3,746,048

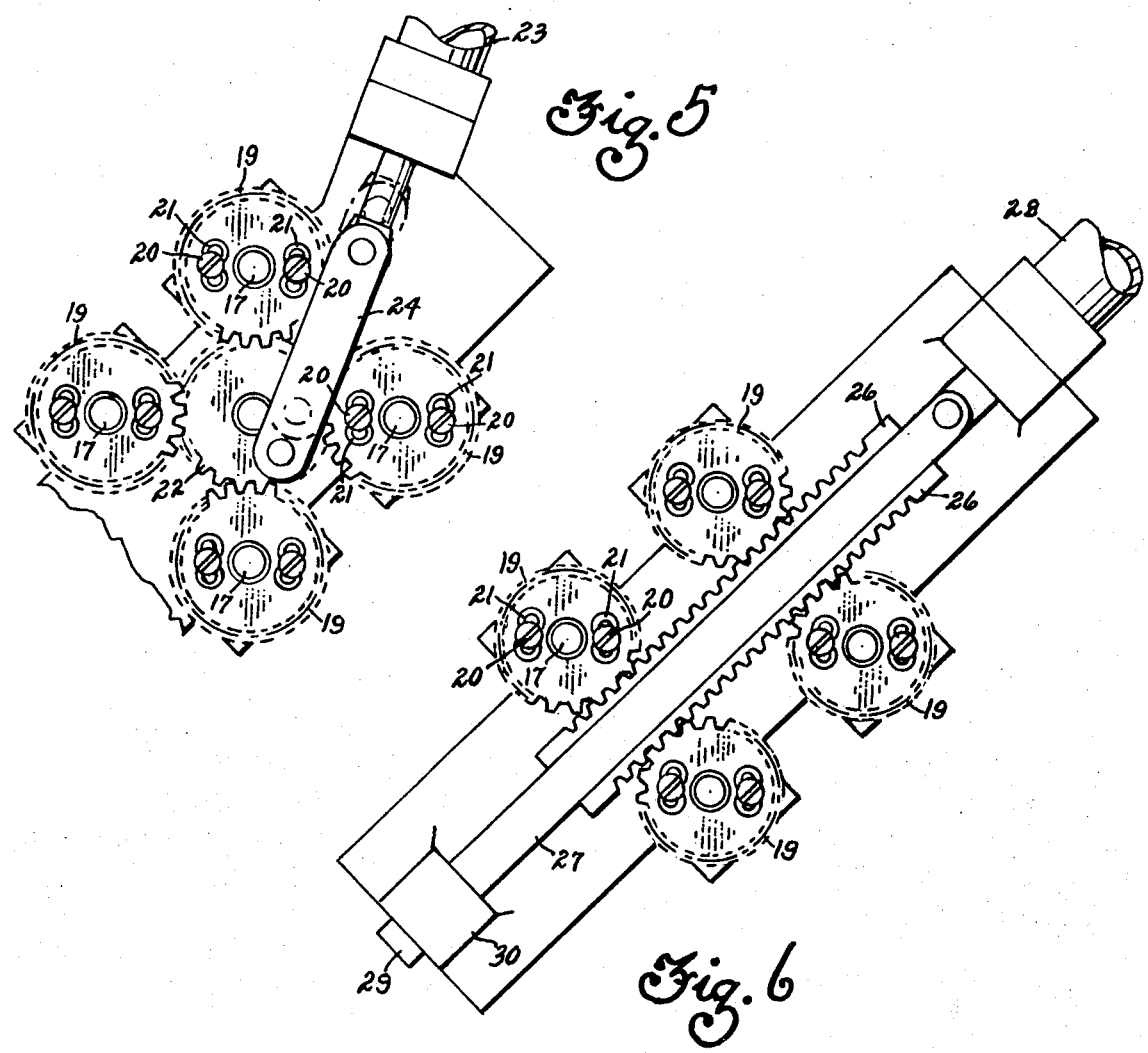

FLUID METERING SYSTEM

BACKGROUND OF THE INVENTION

This invention relates to fluid metering systems and more particularly to an improved fluid metering system which permits the adjustable flow of a plurality of fluids having different rheological characteristics.

In mixing multi-component systems such as, for example, foam molding compositions it oftentimes is quite critical to assure that the ratio of the several constituents is maintained at a substantially constant level in order to insure suitable foam products. For example, if one or more of the constituents is present in a greater or lesser degree than desired, it may be possible that the physical properties of the resultant molded article are unacceptable in that parts of the molded article may be too soft, contain void spots, or have other undesirable characteristics. Thus it is necessary that the metering of the several streams of constituents be critically controlled and that provision be made for compensating for differences in viscosity, pressure, and flow rate of the several fluids to assure a continuous and predetermined rate of flow of the several components, both upon start-up and also during the steady-state operation of the device. Although it has been suggested in the part that the several component inlet valves be operated from a common actuator to insure the correct ratio of the several constituents, it has not heretofore been possible to make correction for slight physical differences in one or more of the constituents, which because of changes in the viscosity, or pressure may begin flowing at different times. The different flow starting times may alter the ratio of one of more of the constituents to another constituent in the final mixture with possible deleterious results in the molded products.

In the present state of the art, certain well-established procedures are commonly used in an effort to insure that all of the individual streams enter the mixing section simultaneously and at the proper instantaneous flow rate upon start-up. Failure to accomplish this goal leads to a problem known as "lead-lag" or "initial spot" in which an off-ratio condition present only the instant of start-up causes a defect in the molding in the area where the small amount of off-ratio mixture is located in the molding. While this same problem can exist at the end of the mixing cycle, its existence there is usually not a problem since the last part of the mixture does not generally enter the mold but, instead, remains briefly in the mixing section by virtue of its viscosity and then is washed or flushed out of the mixing section by a solvent and discarded.

One commonly used procedure to minimize the problem of balancing the ratio of the constituents consists of continually pumping each stream of means of a positive displacement pump from its respective storage tank through a non-adjustable, three-way valve situated as closely as possible to the mixing section and back again to the storage tank or reservoir. In this way, a supply of each stream is maintained at its proper flow rate and temperature and is available at the mixing section merely by switching the three-way valves to exit to the mixing section instead of returning the stream to the storage container. By means of a back pressure valve in the return line from the three-way valve to the storage tank, and a variable orifice in the line from the three-way valve to the mixing section, the pressure in the three-way valve is maintained the same during recirculation to the storage tank as during a mixing cycle. This procedure, called pressure balancing, helps to prevent a fluctuation in pressure at the beginning of the mixing cycle which would momentarily alter the flow rate in spite of the use of a positive displacement pump. In addition, the orifices are sized to give all streams an equal velocity as they exit from the orifice into the mixing chamber. If the streams upon start up leave their respective orifices simultaneously and travel the same distance at the same speed before striking the first surface of the mixing section, they should all strike that mixing surface simultaneously, insuring a correct ratio of the several components the instant they begin to mix. Finally, the various three-way valves are arranged for synchronous operation by, for example, placing them all on a common shaft to insure simultaneous switching of all streams.

In theory, the above-described measures should prevent the occurrence of a lead-lag problem; in practice, however, they usually do not. The reasons for this vary with the design of the mixing unit. For example, design restrictions usually require entry of the various streams at the top of the mixing section so the mixing section will drain freely under the influence of gravity. This arrangement makes it difficult to prevent draining of the fluid left in the conduit between the three-way valve, the orifice, and the entrance to the mixing section. This drainage into the mixing section during inactive periods is influenced by the viscosity and surface tension of the individual component streams which explains what the conduit of one stream may be completely or partially drained and uncontrollably and non-repetitively from one mixing cycle to the next. This is drainage into the mixing section during inactive periods causes certain problems. First, material may contaminate the freshly cleaned mixing section causing an initial spot problem at the start of the next mixing cycle. Secondly, drainage leaves the conduit between the three-way valve and the orifice at least partially empty. This causes a sudden loss of pressure in the fluid upon switching of the three-way valve to the mixing section and until the fluid reaches the restriction of the orifice and regains its normal pressure, this sudden change in pressure changes the flow rate instantaneously due to the lag which occurs while this portion of the conduit is being refilled. There is also a time lag while the empty or partially empty conduit is being refilled. An additional time lag can be caused by the use of a flexible conduit which can increase in cross-sectional area by virtue of the sudden application of pressure.

The present invention is intended to overcome the above-described difficulties by providing a fluid metering device which includes provisions for adjusting the input quantities of constituents for differences in rheological conditions of the individual streams to thereby assure the desired ratio of the several constituents during both start-up and steady-state conditions and thus provide improved quality end products.

SUMMARY OF THE INVENTION

Briefly stated, in accordance with one aspect of the present invention, a fluid metering system is provided for assuring a substantially constant supply ratio with a plurality of components of a multi-component mixture during both steady-state and start-up conditions. The system includes a plurality of inlet valves, one for each of the fluids constituting a substantial portion of the mixture, and also includes means for simultaneously actuating each of the inlet valves from a no-flow to a full-flow position in the outlet of each of the valves. Means are provided for adjusting the relative angular positions of the valve members for each of the valves in order to permit variation in initial flow times between the valves to compensate for timing differences caused by differences in pressure or viscosity that may exist between the several components which form the multi-component mixture.

BRIEF DESCRIPTION OF THE DRAWINGS

FIG. 5 is a top view of the device shown in FIG. 1 and illustrates the valve actuation arrangement of the apparatus of FIG. 1.

FIG. 6 is an alternative valve actuation system suitable for simultaneously actuating the valves shown in the device of FIG. 1.

DESCRIPTION OF THE PREFERRED EMBODIMENT

Figure 1:
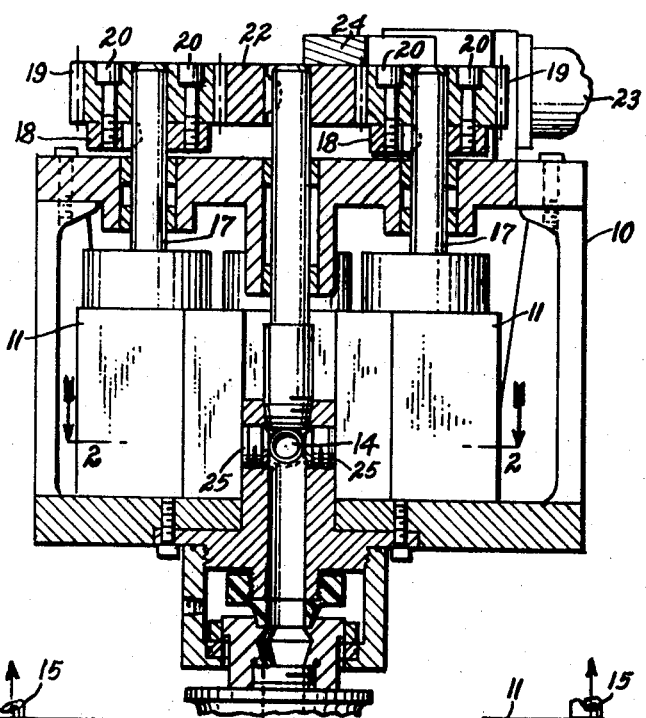
FIG. 1 is a cross-sectional view of the fluid metering system of the present invention showing the several parts thereof in their operative relationship.
Figures 2, 3:
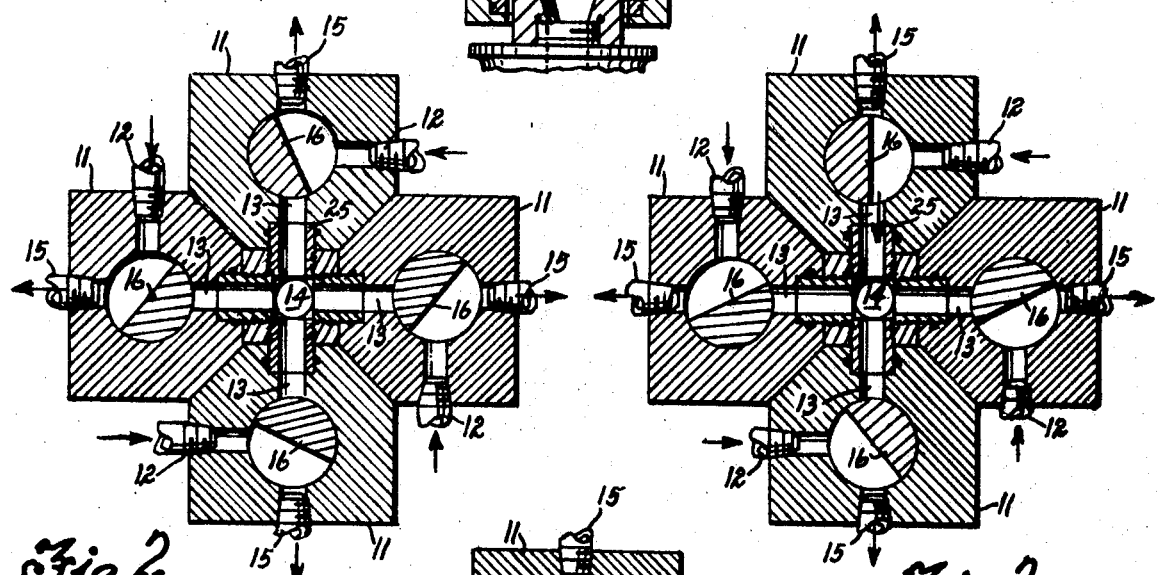
FIG. 2 is a cross-sectional view of the system of FIG. 1 taken along the line 2—2 of FIG. 1 when all valves are closed with respect to the mixing chamber and in a position to recirculate each of the constituents to its source.
FIG. 3 is a cross-sectional view similar to that of FIG. 2 wherein the valve members have each been advanced clockwise a small degree and in which one of the valves is partially opened to the mixing chamber while the remaining valves are still closed thereto and permit recirculation of their respective components.

Referring now to the drawings and particularly to FIG. 1 thereof, there is shown the fluid metering device of the present invention. The device includes a material inlet section comprising a housing 10 which carries a plurality of three-way valves 11 each of which is connected to a source (not shown) of one of the fluid components to be intermixed. As best seen in FIG. 2, each of valves 11 includes an inlet port 12 and has one outlet port 13 arranged to discharge into a central chamber 14 and another outlet port 15 so arranged to return the material to its source to provide a recirculation path. The arrangement of the several valves 11 and their relationship to central chamber 14 is clearly shown in FIG. 2, which also illustrates the material inflow and outflow paths. As shown, the valve members 16 of the several valves 11 can be arranged to selectively permit the flow of one or more of the several components into chamber 14. The positions of the several valve members 16 of valves 11 as shown in FIG. 2 is such that outlet ports 13 are closed while outlet ports 15 are open, thus permitting each of the materials to be recirculated back to its respective source (not shown).

Referring once again to FIG. 1, valve member 16 in each of the valves is actuated by means of a shaft 17 connected thereto and which extends through the top of the valve body and through the top of housing 10. Each shaft 17 includes a drive disk 18 which is keyed thereto to permit it to rotate together with the shaft. Positioned above each drive disk 18 and concentric with shaft 17 is a drive gear 19, which loosely surrounds and is capable of relative rotation with respect to shaft 17. Drive gear 19 is coupled to drive disc 18 by means of a pair of bolts 20 which extend through drive gear 19 and into drive disc 18. As shown more clearly in FIG. 5, the circumferential position of each drive gear 19 relative to its respective drive disc 18 can be adjusted by virtue of a pair of spaced arcuate slots 21 formed in drive gears 19 and through which connecting bolts 20 pass to permit each of drive gears 19 to be circumferentially displaced and positionally adjusted with respect to its cooperating drive disc 18 when connecting bolts 20 are loosened. Each of drive gears 19 of valves 11 is driven by a central pinion 22, which can be rotated through a portion of a revolution by means of an hydraulic cylinder 23 and link system 24. Thus, each of the several valves 11 is operable simultaneously with each of the others although by virtue of the relative positioning between the several drive gears 19 and their respective drive discs 18, the opening time and extent of opening of the several valves can be varied with respect to those of the other valves. Consequently, adjustment of the angular position of valve members 16 can be effected to compensate for the pressure or viscosity of one or more of the incoming constituents to thereby insure the desired instantaneous ratio between the several constituents in the final mixture at the instant of start-up.

Chamber 14 into which the several valves 11 convey the constituents of the mixture can be so arranged that the several incoming streams impinge upon one another to provide some degree of initial mixing therebetween. Furthermore, the chamber can include a plurality of threaded inserts 25 adapted to provide communication between the respective valve outlets 13 and the interior of chamber 14. If desired, the inserts can include flow control orifices (not shown) or restrictions to control the pressure or velocity of one or more of the constituents.

As shown more clearly in FIG. 2, the valve member 16 of each of the several individual valves 11 is positioned with respect to central chamber 14 at an angle which differs from that of the remaining valve members. This difference in relative angular position is accomplished by means of the adjusting structure illustrated in FIGS. 1 and 5 and which has already been described hereinabove. As shown in FIG. 2, each valve member 16 is in such an angular position that the incoming fluid which enters each of the valves 11 is redirected through the respective outlets 15 back to the source of the respective components to thereby provide a recirculation path. As valve members 16 are simultaneously turned clockwise to open the valves, the differences in relative angular positions between the respective valve members 16 are such as to permit materials which differ in viscosity, or which are furnished at a pressure which is different from that of the others, to be provided to central chamber 14 at about the same point in time. For example, in FIG. 3 each of the central valves members of FIG. 2 has been rotated a slight degree, say about 10° or so clockwise, and the uppermost valve is in such a position that a portion of the flow is permitted to recirculate to the source while the other portion is permitted to proceed toward central mixing chamber 14. In this particular configuration, the uppermost valve would be utilized to control the flow of the most viscous fluid or, alternatively, that particular fliud which is under the lowest pressure, since it would ordinarily reach the central mixing chamber at a point in time after that at which the remaining fluids would reach it, assuming that all the valves were simultaneously opened.

Figure 4:
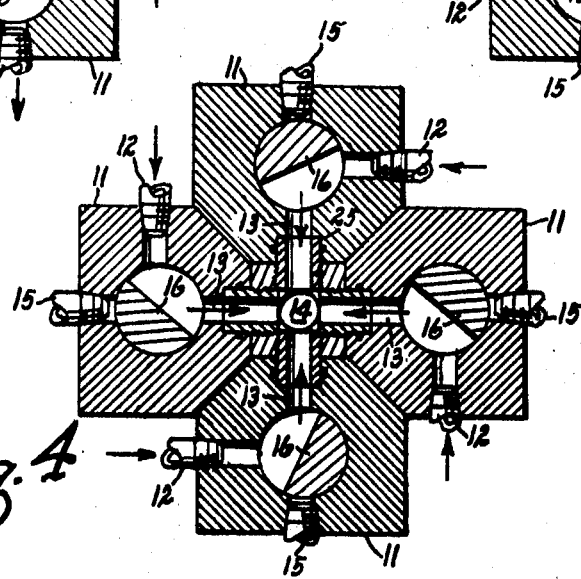
FIG. 4 is a cross-sectional view similar to that of FIG. 2 wherein all the valve members are fully opened to permit all constituents to flow to the mixing chamber.

In FIG. 4 each of the central valve members has been moved approximately 90° from their respective positions shown in FIG. 2. Each of the valves should now be in a position such that each of the incoming fluids is directed toward the central mixing chamber and none is directed to its source, thereby closing off the recirculation paths. Thus, at the particular point in time illustrated by the configuration shown in FIG. 4, the device is in full-flow operation, and each of the constituents to be intermixed is flowing into the central mixing chamber at the desired flow rate so that the resulting mixture conforms to the predetermined ratio of the several constituents.

As shown in FIG. 5, the circumferential position of drive gears 19 of each of the respective valves 11 can be adjusted by virtue of the arcuate slots 21 formed therein and through which the connecting bolts 20 pass to permit drive gears 19 to be circumferentially displaced and positionally adjusted with respect to their respective drive discs 18 when connecting bolts 20 are loosened. Each of the several valves is operable simultaneously with each of the others, although by virtue of the relative positioning between the several drive gears and their respective drive discs, the opening time and extent of opening of the several valves can be varied with respect to those of the other valves. Consequently, adjustment of the angular position of valve members 16 can be effected to compensate for the pressure or viscosity of one or more of the incoming constituents in order to assure the desired ratio between the several constituents and the final mixture, both upon start-up and after the valves are fully opened.

FIG. 6 illustrates an alternative embodiment for simultaneously actuating each of the several valve elements 16 while simultaneously permitting relative angular adjustment therebetween. In this embodiment drive gears 19, which are adjustably attached to the respective drive discs 18, as in the embodiment of FIG. 5, are actuated by means of a rack 26 which meshes with two of drive gears 19. Each of the racks is carried by common supporting bar 27 which, in turn, is linearly actuated by means of an hydraulic cylinder 28. Thus, as the piston (not shown) within hydraulic cylinder 28 is caused to move axially the several valves 11 are simultaneously either opened or closed and the position of the individual valve members 16 can be adjusted in a manner similar to the embodiment shown on FIG. 5. Preferably, supporting bar 27 is supported at its free end 29 by means of a boss 30 for added stability and rigidity. Although racks 26 as shown in FIG. 6 are fixed with respect to supporting bar 27, it is possible to provide a separate rack (not shown) for each drive gear 19 and have that rack linearly adjustable in position to provide the difference in value opening time provided by the use of bolts 20 and arcuate slots 21 in the embodiment shown. In that event, drive gear 19 can be keyed to shaft 17 and drive discs 18 can be eliminated.

While particular embodiments have been illustrated and described, it will be apparent to those skilled in the art that various changes and modifications can be made and it is intended to cover in the appended claims all such changes and modifications that are within the scope of this invention.

What is claimed is:

1. A fluid metering system for assuring a substantially constant supply ratio of a plurality of components of a multi-component mixture during both steady-state and start-up conditions, said system comprising:
   a. a plurality of valves, one for each fluid constituting a substantial portion of the mixture;
   b. means for simultaneously actuating each of said valves from a no-flow to a full-flow position at the outlet of each of said valves;
   c. means for adjusting the relative angular positions of the valve members of each of said valves to permit variations in initial flow rates between said valves; and
   d. a receiver into which said valves discharge said components.

2. The fluid metering system of claim 1 wherein said valves are three-way valves.

3. The fluid metering system of claim 1 wherein each of the valves is so arranged that all valve members rotate in the same direction in going from a no-flow to a full-flow condition.

4. The fluid metering system of claim 1 wherein orifices are positioned at the outlets of at least one of said valves.

5. The fluid metering system of claim 1 wherein the position of the valve members of each of said valves is actuated by means of a drive gear connected to a rotatable shaft attached to said valve members.

6. The fluid metering system of claim 5 wherein each of said drive gears is actuated by a pinion centrally positioned with respect to said valves.

7. The fluid metering system of claim 6 wherein said drive gears are of equal size.

8. The fluid metering system of claim 5 wherein each of said drive gears is releasably and adjustably connected to a cooperating drive member which is drivingly connected to its respective rotatable shaft.

9. The fluid metering system of claim 8 therein each of said drive gears can be circularly adjusted and fixed in position with respect to its cooperating drive member.

10. The fluid metering system of claim 9 wherein each of said drive gears is contiguous with a major portion of its cooperating drive member and includes a pair of spaced arcuate slots through which said drive gear can be bolted to its respective drive member.

11. The fluid metering system of claim 5 wherein a pair of said drive gears is actuated by unitary rack which intermeshes therewith and is carried by a supporting means.

* * * * *